United States Patent [19]

Hung

[11] Patent Number: 5,499,655
[45] Date of Patent: Mar. 19, 1996

[54] ONE-WAY VALVE STRUCTURE FOR A HYDRAULIC JACK

[76] Inventor: Michael Hung, 9-16, Nan Kan Hsia, Nan Kan, Lu Chu Hsiang, Tao Yuan County, Taiwan

[21] Appl. No.: 368,613
[22] Filed: Jan. 4, 1995
[51] Int. Cl.⁶ ...................................................... B66F 3/24
[52] U.S. Cl. ...................... 137/512.3; 137/539; 137/544; 254/93 H
[58] Field of Search ............................... 137/512.3, 539, 137/549; 254/93 H

[56] References Cited

U.S. PATENT DOCUMENTS 2,202,211  5/1940  Kling ................................... 137/549 X
4,703,916  11/1987  Hung ..................................... 254/93 H Primary Examiner—Robert G. Nilson
Attorney, Agent, or Firm—Wenderoth, Lind & Ponack

[57] ABSTRACT

An improved one-way valve structure for a hydraulic jack includes a stepped inlet end at a L-shaped intake passage for fixing of a filter. The diameter of the filter is slightly smaller than the inner diameter of the intake passage. The filter is designed so that it can be firmly positioned in the inlet end of the intake passage. Hydraulic fluid is filtered by the filter at the intake passage while it is passing through the one-way valve so that foreign particles in the hydraulic fluid from an oil reservoir are completely prevented from entering a pump seating and a pumping cylinder. Hence, the hydraulic fluid entering the pumping cylinder upon pushing of a handle on the pump seating does not contain impurities. In particular, as there are no foreign particles clogging the pressure release passage, normal pressure relief whenever the jack is overloaded can be assured to discharge the hydraulic fluid to the oil reservoir automatically. Consequently, damage to or explosion of the cylinder can be prevented.

1 Claim, 3 Drawing Sheets

ONE-WAY VALVE STRUCTURE FOR A HYDRAULIC JACK

BACKGROUND OF THE INVENTION 1. (a) Field of the Invention

The present invention relates to an improved one-way valve structure for hydraulic jack, particularly one with a stepped inlet end at an intake hole for fixing of a filter, the diameter of the filter is slightly smaller than the inner diameter of the intake hole to make the hydraulic fluid be filtered while it is entering the pump seating so that foreign particles are completely prevented from entering the pump seating, and consequently clogging of the oil circuit or damage of the cylinder can be prevented.

2. (b) Description of the Prior Art

In the conventional hydraulic jack, such as that disclosed in the U.S. Pat. No. 4703916, an one-way valve is installed between its oil reservoir and pump seating to control hydraulic fluid flow from the oil reservoir to the pump seating, and cause the jack to lift by pushing a handle which drives a pumping cylinder and consequently a piston. The one-way valve is designed with a pressure release hole to allow the hydraulic fluid to flow to the oil reservoir through it upon overload of the jack for safety purpose and to prevent from explosion of the cylinder. However, the structure disclosed in the said patent is simply a oil circuit design without any means to prevent from invasion of foreign particles from the oil reservoir to the pump seating or pumping cylinder. Prolonged use of the jack may result in accumulation of foreign particles in the oil circuit or on the cylinder components, and even clogging of the oil circuit or damage of the cylinder. Particularly, as the inlet of the pressure release valve is relatively small, the clogging there may prevent from backflowing of the hydraulic fluid to the oil reservoir. Then, clogging at the pressure release valve which can not be discovered from its appearance may bring serious explosion and even death or injury. In other word, it is a significant negligence in design for safe operation of hydraulic jack.

SUMMARY OF THE INVENTION

The main objective of the present invention is to provide an improved one-way valve structure for hydraulic jack with an intake hold, an outlet hold and a pressure release hold. A stepped inlet ends at an intake hole of the one-way valve for fixing of a filter, the diameter of the filter is slightly smaller than the inner diameter of the intake hole to make the hydraulic fluid be filtered by the filter at the intake hole while it is entering the pump seating so that foreign particles in the hydraulic fuild from the oil reservoir are completely prevented from entering the pump seating and the pumping cylinder, no clogging may occur in the hydraulic fluid circuit or the pumping cylinder, the jack can be maintained in good working condition for a long time, in particular, as there is no foreign particle which may clog the pressure relieve hole, normal pressure relief whenever the jack is overloaded can be assured to discharge the hydraulic fluid to the oil reservoir automatically, and consequently damage or explosion of the cylinder can be prevented.

DETAILED DESCRIPTION OF THE PREFERRED EMBODIMENTS

Figure 1:
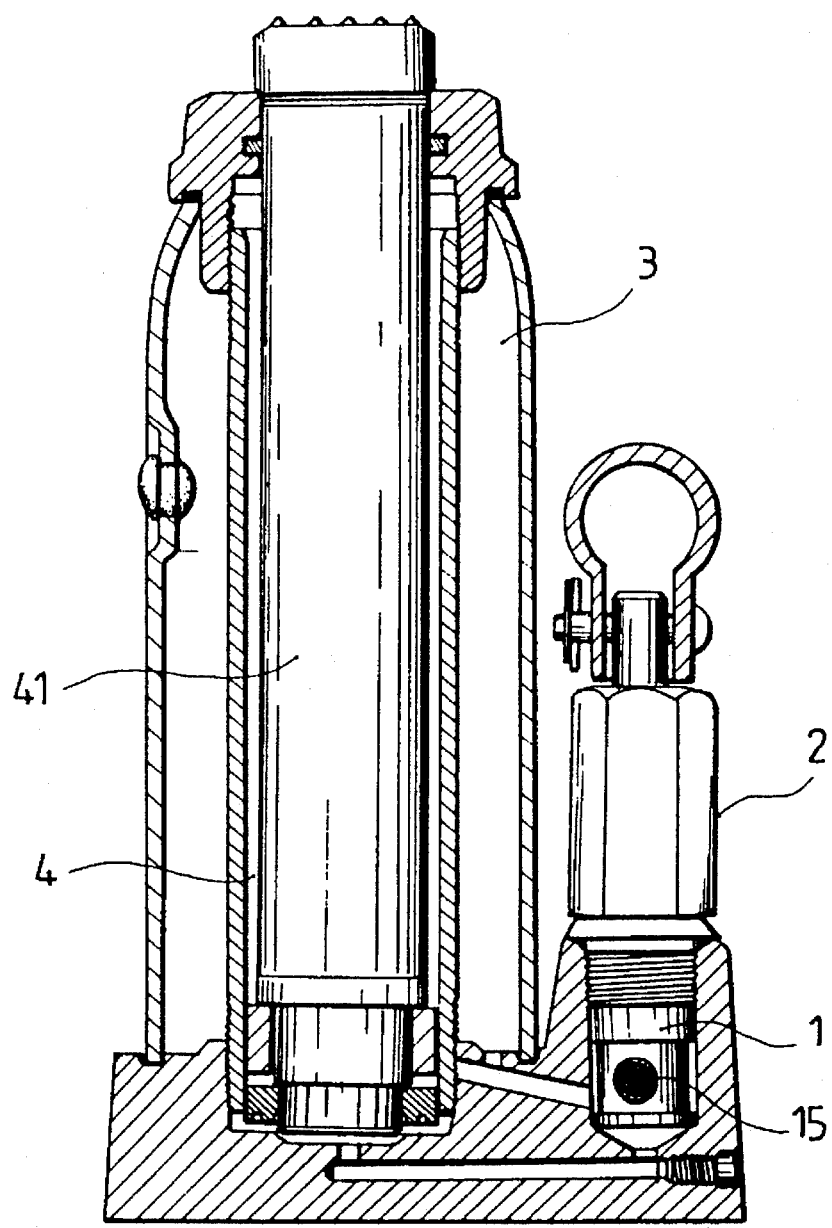
FIG. 1 is a sectional view of an one-way valve according to the present invention for use on hydraulic jack.

As shown in FIG. 1, the one-way valve 1 in the hydraulic jack according to the present invention is located within a pump seating 2 mainly to control hydraulic fluid flow from an oil reservoir 3 to the pump seating 2 so as to cause the hydraulic fluid to enter a pumping cylinder 4 which consequently drives a piston 41 to rise with the effect of a handle (not shown) on the top of the pump seating 2.

Figure 2:
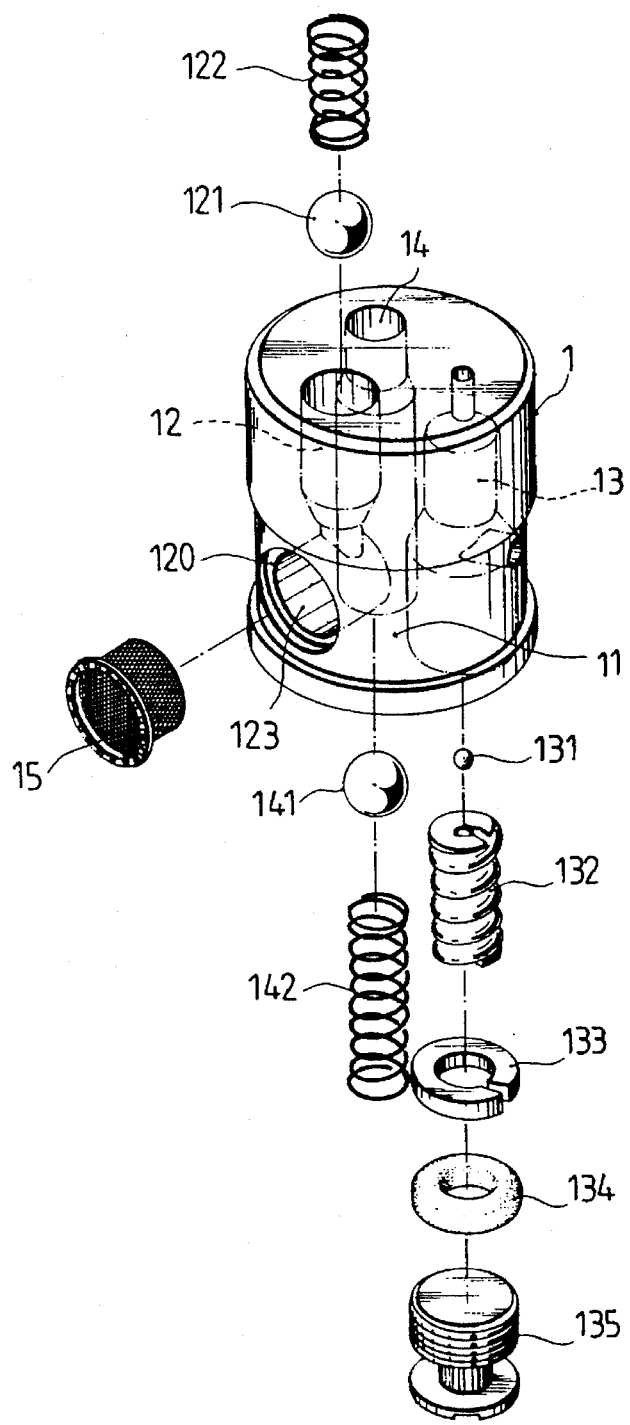
FIG. 2 is a fragmented perspective view of the one-way valve according to the present invention.
Figure 3:
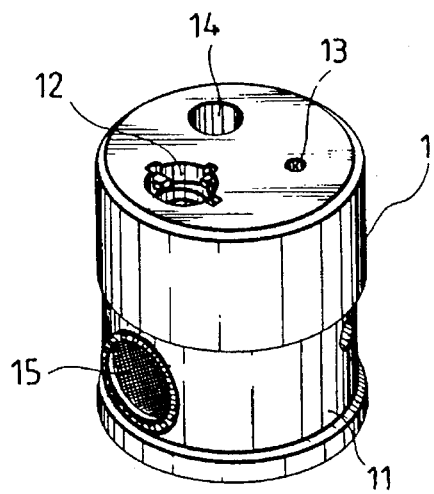
FIG. 3 is a perspective view of the one-way valve according to the present invention.
Figure 4:
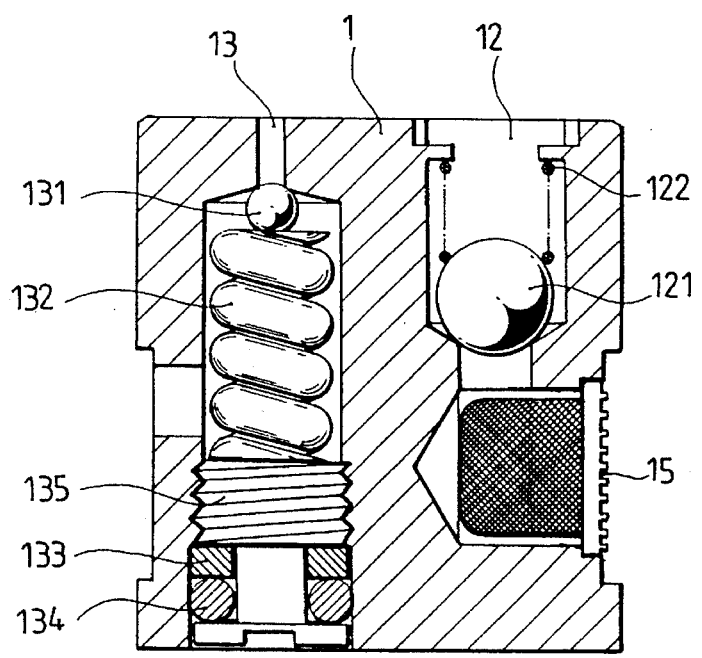
FIG. 4 is a longitudinal sectional view of the one-way valve according to the present invention.

As shown in FIGS. 2 thru 4 disclosing structure of the aforesaid one-way valve 1, the one-way valve 1 is a cylindrical structure with an annular coulisse 11 on the its cylindrical body. A L-like intake hole 12 and a pressure release hole 13 are designed between the coulisse wall of the annular coulisse 11 and an end of the one-way valve 1, and an outlet hole 14 is passing through the one-way valve 1. Each of the intake hole 12, the pressure release hole 13 and the outlet hole 14 has a built-in steel ball 121, 131 or 141) and a spring 122, 132 or 142 to provide an one-way control on passing through of the hydraulic fluid. An end of the pressure release hole 13 is incorporated with a C-ring 133, an oil seal 134, and a screw element 135 to adjust tension of the spring 132. The inlet end 123 of the said intake hole 12 has a step 120 for fixing of a filter 15 so that the filter cover 15 is positioned flush with the inlet end 123. The filter 15 is a cup-like structure, its diameter is slightly smaller than the inner diameter of the intake hole 12 and it is designed so that it can be firmly positioned in the inlet end 123 of the intake hole 12.

With an assembly of the said one-way valve 1 with the filter 15, the hydraulic fluid is filtered by the filter 15 at the intake hole 12 while it is passing through the pump seating 2 so that foreign particles in the hydraulic fluid from the oil reservoir 3 is completely prevented from entering the pump seating 3 and the pumping cylinder 4. Hence, the hydraulic fluid entering the pumping cylinder 4 upon pushing of the handle on the pump seating 2 does not contain impurity, and consequently no clogging may occur in the hydraulic fluid circuit or the pumping cylinder 4, the jack can be maintained in good working condition for a long time. In particular, as there is no foreign particle which may clog the pressure relieve hole 13, normal pressure relief whenever the jack is overloaded can be assured to discharge the hydraulic fluid to the oil reservoir 3 automatically, and consequently damage or explosion of the cylinder can be prevented.

I claim:

1. An improved one-way valve structure for a hydraulic jack having a one-way valve located within a pump seating to control hydraulic fluid flow from an oil reservoir to the pump seating so as to cause the hydraulic fluid to enter a pumping cylinder to consequently drive a piston to rise by pushing a handle at the pump seating, said one-way valve structure comprising:

a cylindrical body with an annular coulisse, an L-shaped intake passage and a pressure release passage extending between a coulisse wall of said annular coulisse and an end of said body, and an outlet passage passing through said body, each of said passages having therein a steel ball and a spring, an end of said pressure release passage having therein a C-ring, an oil seal, and a screw element to adjust tension of the respective said spring, an inlet end of said said intake passage having a step for fixing of a filter so that a filter cover thereof is positioned flush with said inlet end, said filter being a cup-like structure having a diameter slightly smaller than an inner diameter of said inlet end of said intake passage, and whereby hydraulic fluid is filtered by said filter at said intake passage while passing through said one-way valve so that foreign particles in the hydraulic fluid from the oil reservoir are completely prevented from entering the pump seating, and consequently clogging of the oil circuit or damage to the cylinder can be prevented.

* * * * *